No. 672,183. Patented Apr. 16, 1901.
W. G. TRETHEWAY.
AUTOMATIC TRAIN PIPE COUPLING.
(Application filed June 6, 1900.)
(No Model.) 3 Sheets—Sheet 1.
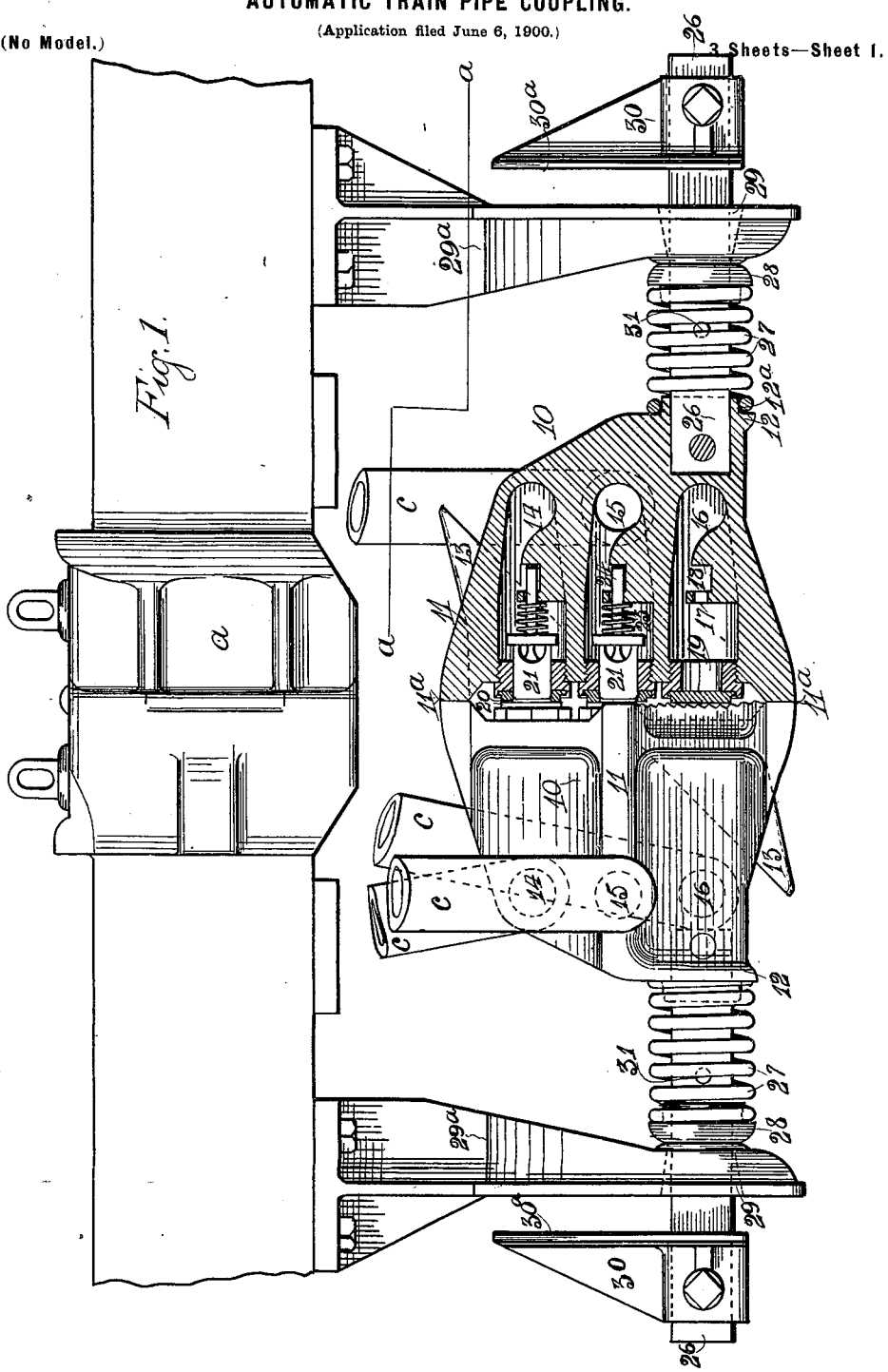
WITNESSES:
Rowland Brittain
Edith G. Mackenrot
INVENTOR,
W. G. Tretheway.

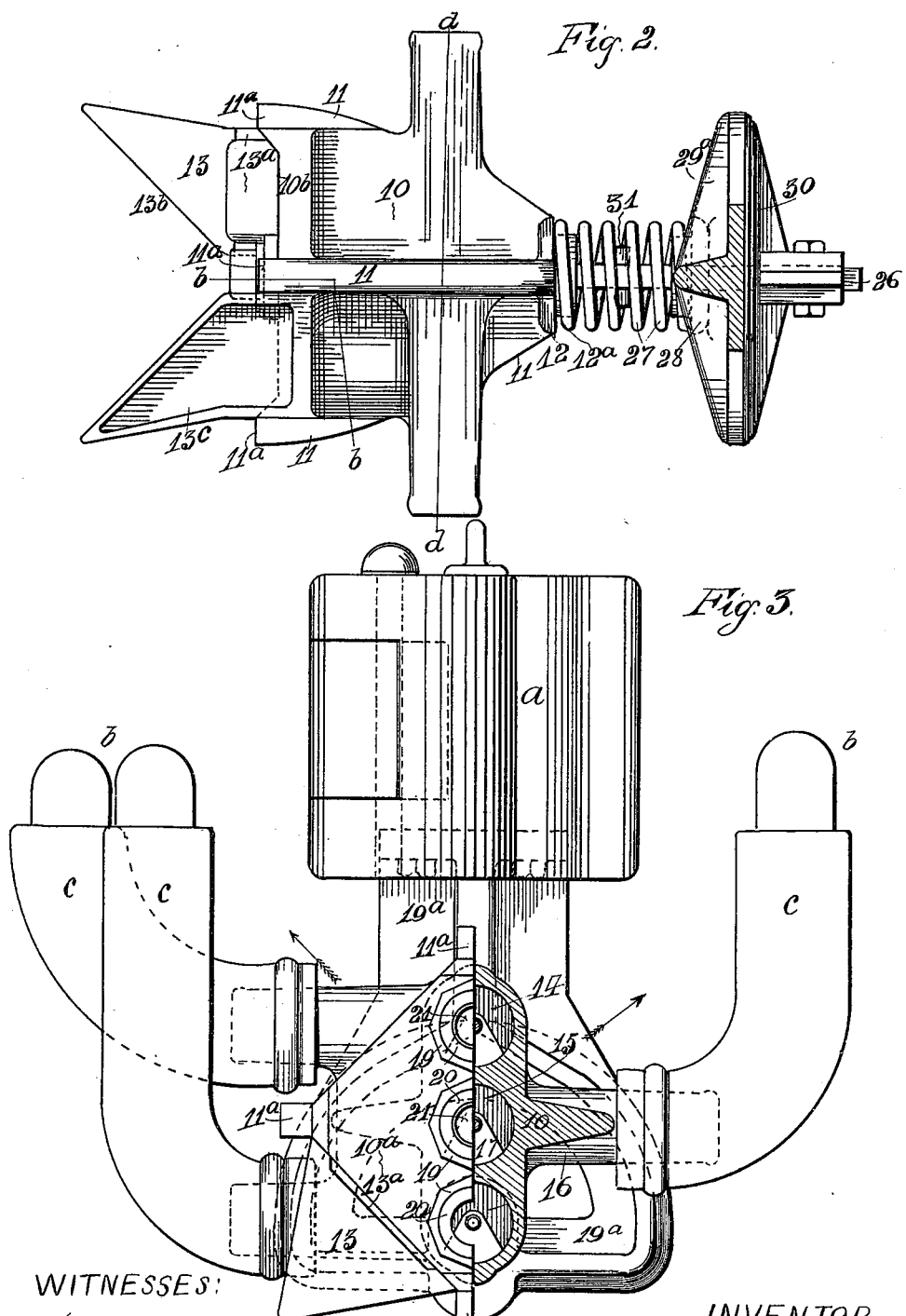

No. 672,183. Patented Apr. 16, 1901.
W. G. TRETHEWAY.
AUTOMATIC TRAIN PIPE COUPLING.
(Application filed June 6, 1900.)
(No Model.) 3 Sheets—Sheet 3.
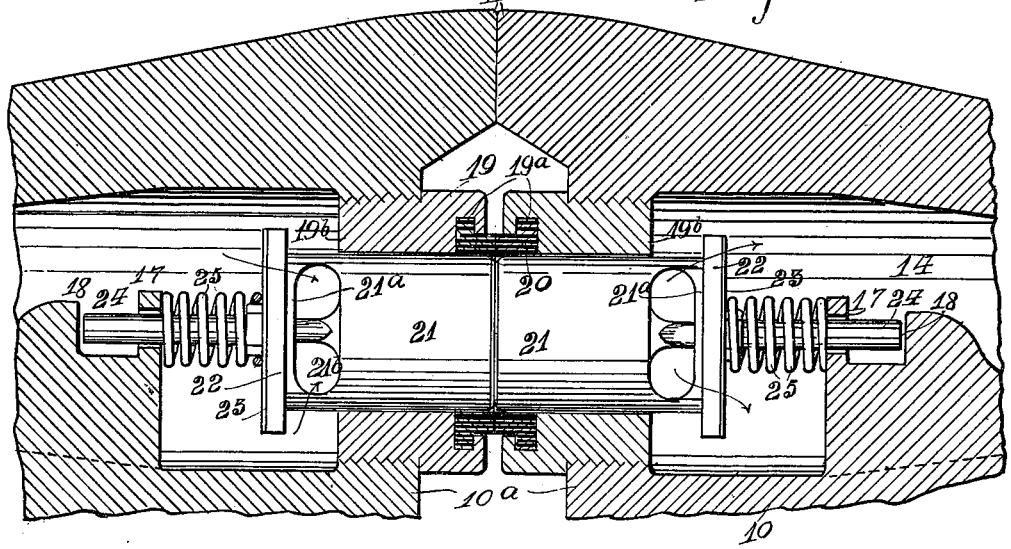
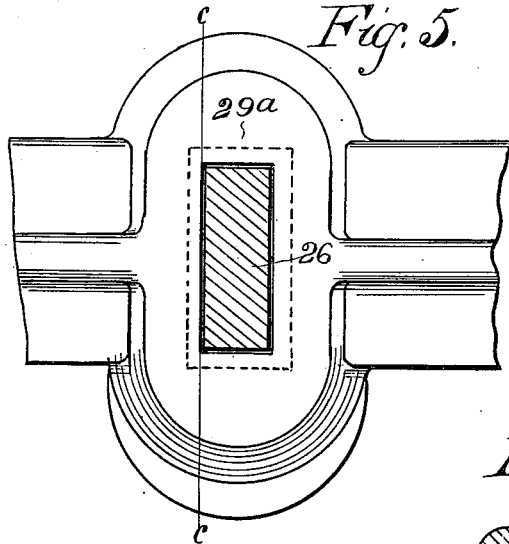
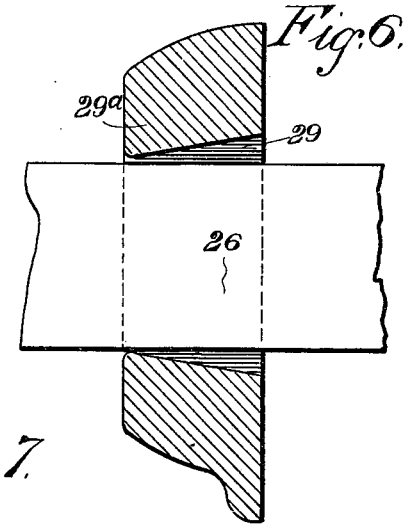
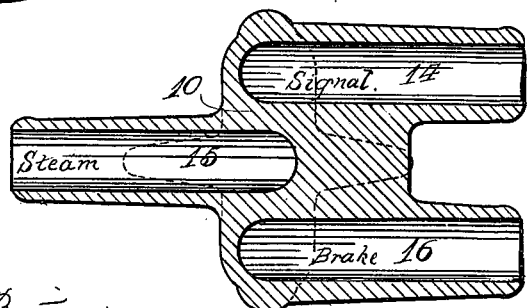
WITNESSES:
Rowland Brittain
Edith G. Mackenrot
INVENTOR
W. G. Tretheway

UNITED STATES PATENT OFFICE.

WILLIAM GRIFFITH TRETHEWAY, OF VANCOUVER, CANADA.

AUTOMATIC TRAIN-PIPE COUPLING.

SPECIFICATION forming part of Letters Patent No. 672,183, dated April 16, 1901.

Application filed June 6, 1900. Serial No. 19,233. (No model.)

*To all whom it may concern:*

Be it known that I, WILLIAM GRIFFITH TRETHEWAY, a citizen of the Dominion of Canada, residing at Vancouver, in the Province of British Columbia, Canada, have invented a new and useful Automatic Train-Pipe Coupling, of which the following is a specification.

My invention relates to an improved method for coupling the steam and air pipes between the carriages of a railway-train; and my objects are, first, to provide an apparatus that will connect the said pipes automatically and open the valves in the steam and signal pipes, causing free communication therethrough when the carriages are coupled together, but when such carriages are parted causing the valves to close automatically, so that the connections do not require an attendant; second, to provide that while the coupling-heads of the said pipes are held together the joint at the contact will not open by the oscillation of the carriages by reason of the bearing-surfaces of the heads having a much wider area than the surfaces at the points of support in the hangers beneath the draw-bars, and, third, to cause the pipe-coupling heads to adjust to a horizontal and a proper alining position when the carriages are drawn apart, so that the said heads will properly engage each other when the carriages are brought together and when coupled to allow the heads to have the required upward, downward, and lateral movement for the oscillation or moving of the carriages while in motion with a minimum of resistance. I attain these objects by the mechanism illustrated in the accompanying drawings, in which—

Figure 1 is a side elevation of my improved train-pipe coupler with one of the heads sectioned and the lower horn broken off the other head to facilitate illustration. Fig. 2 is a plan of one of the heads, taken from below the draw-bar on the line $a\,a$ in Fig. 1. This shows the supporting-bracket drawn close up to the flattened side of the hanger as it would appear when the pipes are not coupled. Fig. 3 shows a face view of one of the heads as it appears from the end of the carriage to which it is attached with one side of the front removed to the line $b\,b$ in Fig. 2. Fig. 4 is an enlarged sectional detail of one of the sets of automatic valves. Fig. 5 shows a front detail view of the conical aperture in one of the supporting-castings through which the stem of the coupling-head passes. Fig. 6 is a side sectional view of the same, taken on the line $c\,c$ in last figure; and Fig. 7 is a cross-section of one of the heads, taken on the line $d\,d$ in Fig. 2.

Similar numerals refer to similar parts throughout the several views.

In describing the detailed construction of my invention, 10 indicates a head or casting, having a face $10^a$ of rectangular form and webs or ribs 11 on its corners, which project and taper rearward, terminating in a boss 12, arranged on the lower side of the head, but in vertical alinement with its center. The webs 11 terminate in projecting points $11^a$, which extend beyond the rectangular face $10^a$ and at the opposite corners thereof for a reason to be seen presently. The said rectangular face $10^a$ of the head preferably has its diagonal corners formed by the points $11^a$, placed in vertical and horizontal alinement, and on opposite sides of the flattened faces are forwardly-projecting horns 13, the inner sides of which, as $13^a$, are straight for a distance and are designed to engage the unoccupied sides of the face $10^a$, as $10^b$, and the forward portions of these horns are flared outward at an angle of approximately forty-five degrees, as $13^b$, the outer sides having a strengthening-web rib $13^c$, as shown. This outward flaring of the horns causes the heads to properly aline with each other when a coupling is made, as will be made more clear hereinafter.

Arranged through the face of the head are one or more ducts, which curve around and terminate in nipples on the opposite sides of the head, to which are secured flexible pipes which communicate with the train-line pipes. As per Figs. 1 and 3, I illustrate three ducts placed in vertical alinement, as 14, 15, and 16, these being for the signal, steam, and air, respectively, and 17 indicates apertured lugs fixed to the walls of these ducts at a suitable distance from the mouths thereof, and 18 represents stops to the rear of these lugs, for a reason to be seen presently. (See Fig. 4.) Threaded into the faces of the ducts 14, 15, and 16 are valve-thimbles 19, having their outer ends conveniently shaped so they may be gripped by a spanner and screwed up tight or removed, if desired. Fitted into annular seats 19ª in these valve-thimbles are rubber gaskets 20, which may be and preferably are of the regulation size employed in railway pipe-couplings. The faces of these gaskets 20 are arranged on a plane a little above the plane of the bearing-points 11ª, so that when the heads 10 are pressed together a tight joint will be effected by a sufficient compression of the gaskets before the points 11ª engage.

The ducts 14 and 15 in my arrangement are employed as the "signal" and "steam" connections, respectively, and the duct 16 is the "air-brake" connection, and in the two former I employ automatic valves, which each consists of a hollow or tubular stem 21, the inner end of which is sealed up, as 21ª, and having ports 21ᵇ arranged around the base of the periphery thereof; a rubber disk 22 over the closed end of the tubular stem 21 and a metal disk 23 to hold same in place; a rearwardly-projecting stem 24 integral with the closed end 21ª, which stem is passed through the rubber disk and the metal disk and projected through the apertured lug 17 in the respective duct to which it belongs, and a coil-spring 25 on the said stem 24 between the lug 17 and the metal disk 23, which normally keeps the valve pressed forward with the rubber 22 resting on the inner seat of the valve-thimble in which it is mounted when the coupling-heads are not brought together. The valves are pushed back off their seats by the hollow stems 21 engaging each other when the heads are brought together, and thus provide a communication therethrough; but said valves are prevented from being pushed too far in by each opposite engaging one by the stops 18, arranged a proper distance to the rear of the lugs 17, which engage the stems 24. For instance, should one of the tubular stems 21 stick and not at once force the rubber disk 22 from its seat, as soon as the stem 24 of the opposite moving valve engages the stop 18 the stiff valve will be forced back to its open position, and when the heads are drawn apart the springs 25 will force the valves to a closed position, and thus prevent escapement of the stored pressure within the pipes.

As before indicated and shown in Figs. 3 and 4, the plane of the bearing-point 11ª is beyond the plane of the central face of the head 10, so that only such points are contacted and the lower plane within the central area provides convenient space for the outer ends of the valve-thimbles 19, which are all below the surface of the said points 11ª.

When coupling and uncoupling the carriages, the air-duct 16 is opened and closed by an ordinary cock, which may be located in the nipple or in the train-pipe, as is now the case.

Conveniently secured into the boss 12 at the rear end of the head 10 is a flat stem 26. The boss 12 is provided with an annular seat 12ª for the reception of a spring 27, which is slipped over said stem and having its opposite end resting on a like seat on a washer 28, slidably mounted on the stem, the full object of which will be made manifest directly. The projecting end of the stem 26 passes through a conical aperture 29 in a hanger 29ª, secured beneath the coupling draw-head of the carriage. Secured to the projecting end of the stem 26 on the rear side of the hanger 29ª is a bracket 30 of semicircular form, having a flattened face 30ª, designed to rest, when the head 10 is pushed forward by the spring 27, against a like flattened portion on the rear side of the hanger 29ª. This bracket 30, with the spring 27, acts as a lever against the weight of the coupler-head, the said spring being of sufficient strength to draw the fulcrum-point of the stem out until the face of the bracket 30ª is brought against the flattened face of said hanger, and thus when the carriages are drawn apart the head will be held in a horizontal position and practically alined with the opposite head on the other carriage. When the carriages are apart, the stem and head are the lever, the bottom of the conical opening 29 being the fulcrum, and the flattened faces are the point of contact that supports the load, and the spring 33 must be of ample strength for this. The head is held in its upright position and prevented from turning by reason of the stem being flat, and it is allowed to move up and down and laterally when pressed back by the particular form of the hole 29. (See Figs. 5 and 6.)

As better shown in Figs. 2 and 3, the face of the hanger 29ª, adjacent to the flattened face of the bracket 30, is widened out so as to present sufficient leverage on opposite sides of the stem 26 to hold the head in alinement in the same manner as said head is supported.

Each head 10 is so mounted that when pressed forward the plane of the bearing-points 11ª are a trifle forward of the face of the draw-head coupler a, and when the heads are brought together the brackets 30 are pressed back from the flattened surface of the hangers when the weight of each head is supported against its opposite one by being transferred to the upper bearing-point 11ª. These bearing-points 11ª, as shown, are projected outward, which gives the desired leverage with the strength of the spring 27 to hold the head up in an alined position with its engaging head, and when such engagement is made the two heads are as an integral part, the movement being taken from the points where the stems 26 lie in the coned openings 29 in the hanger 29ª. As illustrated in Fig. 1, the stems 26 are placed below the center or axis of the heads. It is obvious that this increases the leverage between the upper bearing-points 11ª and the point at the faces of the heads in alinement with the stems 26. This amply overcomes the weight of the heads when depending on the bearing-points 11ª for support, and provides that the pressure exerted against the said points 11ª and the gaskets 20 shall be approximately the same at the bottom and top of the faces.

The leverage to support each head while the pipes are coupled is the distance from the line of the stem of the head to the outside of the upper bearing-point 11$^a$ plus the strength of the spring 27. As shown in Fig. 3, the flexible connections between the ducts in the head and the train-pipes $b$ are curved around to approximately a right angle, so that the pipes make the required curve without buckling. These curves in the pipes allow of the heads being moved up diagonally in the direction of the arrows by the moving of the carriages without great strain on the parts, as would be the case if the rubber hose (which for steam is stiff) were directed straight to the ducts in the head.

In the ordinary steam-coupling now in use there is a slight aperture provided in the seat of the valve, so that the steam may be allowed to leak at the rear end of the train to blow out the condensation that may take place and also to assist circulation. This I anticipate by a slight groove 19$^b$ on one side of the seat in the valve-thimble 19, which has the desired effect. Of course this vent 19$^b$ is provided in the steam-valves only.

Passed through and fixed in the stem 26 at a point just in front of the washer 28 when the head is pushed back, so that the spring 27 is fully compressed, is a stop-pin 31. This prevents one of the heads being pushed too far back, and thereby prevents straining the spring 27 in the event of the springs being unequally balanced.

To provide for coupling the pipes of the carriages having my invention to carriages having the old system in use, the hose-pipes $c$ are removed from the nipples 14, 15, and 16 and short pieces of hose-nipples having the ordinary hand-couplers attached thereto are secured to the nipples of the ducts 14, 15, and 16, and the counterparts of the hand-couplers are secured to the hose-pipe $c$, attached to the train-line pipes, and when a carriage not having my improved coupler is met with the hose-pipes $c$ are uncoupled from the sections of hand-couplers which are attached by the short hose to the nipples of the ducts 14, 15, and 16 and joined with the pipes of the said car not having my improvement, and thus cutting out the automatic pipe-coupler until another car is met having my improvement.

From the foregoing it is shown that my pipe-coupler is simple and cheap of construction, requires no attendant, is self-adjusting, and may be introduced with the old system without seriously affecting traffic, which latter is essential to the introduction of any apparatus of this class.

Having now described the construction and application of my invention, what I claim as new is—

1. In combination with a coupling draw-bar $a$; a hanger 29$^a$ attached to such draw-bar, having a vertically-flattened face on the rear side thereof and a conical vertically-elongated aperture therein near its lower edge; a flat stem 26 passed through such conical opening; a head 10 having a rectangular face and outwardly-sloped horns 13 on opposite diagonal sides, and flattened sides 10$^b$ on the opposite diagonal sides, bearing-points 11$^a$ projecting beyond the face of the casting 10, at each side of the horns 13, valve-thimbles 19 screwed into the face-openings of one or more ducts passing through to each side of said head, the outer surfaces of said thimbles being below the plane of the bearing-points 11$^a$; gaskets 20 arranged in recesses in the faces of the valve-thimbles, the surfaces of which are on a plane beyond the plane of the bearing-points 11$^a$; a stout coil-spring 27 over the stem 26 and resting on a seat designed on a boss on the rear end of the head 10 and a seated movable washer 28 lying against the front face of the hanger 29$^a$, and a semicircular bracket 30, having a parallel bearing-face to the face of the hanger 29$^a$, secured to the projecting end of the stem on the rear side of said hanger from the spring 27, substantially for the purposes set forth.

2. In a train-pipe coupling composed of a head 10 provided with outwardly-sloping horns 13 arranged on its diagonal front corners, and rearwardly-flattened sides 10$^b$ on the opposite corners, a rectangular flattened face between the horns and the flattened sides, and projected bearing-points 11$^a$ on each corner of the rectangular face and one or more curved ducts passing laterally outward through the head 10; gaskets arranged in valve-thimbles in the face-openings of the ducts, which gaskets project beyond the plane of the bearing-points 11$^a$, and means for holding the head in a horizontal flexible position, substantially as and for the purposes set forth.

3. In a train-pipe coupling having a head 10 having ducts passing therethrough to the train connections, in combination with a vertical flat stem 26 secured in a boss on the rear end of the head 10; a hanger 29$^a$ attached to the draw-head of a car having a vertically-disposed elongated conical hole 29 in the lower part thereof designed to remove the stem 26; a bracket 30 of semicircular form having a flattened face designed to lie against the rear flattened face of the hanger; a seat on the rear end of the head 10, and a slidable washer having a rounded rear side designed to lie against the front face of the hanger and having a seat on its front side; a coil-spring on the said stem interposed between the head and the hanger with its opposite ends resting on the said seats.

4. In an automatic train-pipe coupling having a head 10 with outwardly-sloping horns 13 arranged at the opposite diagonal sides of the face of the head with their inner faces 13$^a$ parallel to each other and diagonal to said head but at right angles to a line connecting the said horns; flattened portions 10ᵇ occupying the opposite diagonal sides of the face and parallel to a line connecting the horns; a rectangular face on the head, the sides of which terminate at the inner sides of the straight portions of the horns 13ᵃ and the flattened portions 10ᵇ; projections 11ᵃ at the corners of the rectangular face, the front portions of which are on a plane forward of the rectangular face, and the outer sides of these points project laterally beyond the corners of the face and sides of the head terminating rearwardly in ribs 11 at a boss 12 at the rear end of the head, in combination with a flat stem integral with the bossed rear of the head passed through a slidable washer 28 and a coned hole in a hanger 29ᵃ attached to the draw-head of a car; a compressed spring 27 between the said head and a slidable washer, and a semicircular bracket having a flat bearing-face secured to the projecting end of the stem, designed to bear against the rear flattened side of the hanger, forming, with the spring, a support for the head 10.

5. In combination with a head 10 having tubes passing through same, and bearing gaskets which project beyond the plane of radially-disposed bearing-points 11ᵃ on the corners of said head; a flat stem 26 secured to the rear end of the head and passed through a conical aperture in a hanger 29ᵃ attached to the draw-head $a$; a slidable washer 28 on the stem between the head 10 and the hanger, and a stop-pin or projection 3 in the stem between said washer and the boss of the head; a stout coil-spring compressed between the washer and the said boss, and a bracket 30 fixed to the projecting end of the stem, having a flattened bearing-face with its upper edge approximately semicircular in form, extended above and on opposite sides of the stem 26, substantially for the purposes set forth.

6. In combination with a head having engaging horns and projecting bearing-points 11ᵃ on the corners of its face on each side of the horns; a boss 12 on the rear end of the head having a seat 12ᵃ thereon; a flat stem secured in such boss; a hanger 29ᵃ attached to the coupling draw-head $a$, having a vertically-disposed elongated aperture flared from the rear side to receive the stem, a spring 27 on the stem between the seated boss of the head 10 and a slidable washer 28 having a rounded side lying against the front face of the hanger; a bracket 30 secured on the stem on the opposite side of the hanger, designed to hold the spring in compression and support the head in a horizontal position, and means for preventing the head being pushed back to the straining-point of the spring.

7. A train-pipe-coupling head having one or more ducts therethrough; a valve-thimble arranged in each of the front mouths of the ducts with a gasket 20 fitted in the front end thereof, and the rear end of said seat having a suitable surface to seat a valve; an apertured lug 17 fixed to the wall of each of the ducts; a valve arranged in the seat consisting of a hollow tube 21 with its inner end closed and ports 21ᵇ around its base, and its outer rim or mouth rounded off so as not to present an abrading surface or edge, a rubber disk 22 larger than the diameter of the tube designed to rest against the inner end of the thimble and a metal disk 23 to hold the rubber in place, a stem integral with the closed end of the tube 21 and passed through the disks, and extended through an aperture in the lug 17 and designed to engage a fixed stop 18 when the tube 21 is pushed back, and a spring 25 on the stem between the disk 23 and the lug 17, substantially for the purposes set forth.

8. In an apparatus for the purposes set forth, a valve-thimble consisting of a seat of even surface, having a hollow stem or tube 21 having ports 21ᵇ around its base, slidably arranged in the aperture in the thimble; a stem 24 fixed to the center of the valve and passed through an apertured lug in the duct in which the valve-seat is fixed; a spring 25 arranged under compression between the valve and the lug, and means for preventing the outer end of the tube 21 from being pushed excessively within the outer surface of the valve-thimble.

WILLIAM GRIFFITH TRETHEWAY.

Witnesses:
 ROWLAND BRITTAIN,
 EDITH G. MACKENROT.